US012320591B2

(12) United States Patent
Nardella

(10) Patent No.: US 12,320,591 B2
(45) Date of Patent: Jun. 3, 2025

(54) PLANT FOR THE PRODUCTION OF METAL PRODUCTS AND METHOD OF MANAGEMENT OF SAID PLANT

(71) Applicant: DANIELI & C. OFFICINE MECCANICHE S.P.A., Buttrio (IT)

(72) Inventor: Antonio Nardella, Greve in Chianti (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 176 days.

(21) Appl. No.: 17/917,041

(22) PCT Filed: Apr. 7, 2021

(86) PCT No.: PCT/IT2021/050094

§ 371 (c)(1),
(2) Date: Oct. 5, 2022

(87) PCT Pub. No.: WO2021/205487

PCT Pub. Date: Oct. 14, 2021

(65) Prior Publication Data

US 2023/0152039 A1 May 18, 2023

(30) Foreign Application Priority Data

Apr. 8, 2020 (IT) ........................ 102020000007510

(51) Int. Cl.

| | |
|---|---|
| ***B22D 11/12*** | (2006.01) |
| ***B22D 11/124*** | (2006.01) |
| ***B22D 11/14*** | (2006.01) |
| ***B22D 11/22*** | (2006.01) |
| ***F27D 9/00*** | (2006.01) |
| ***F27D 19/00*** | (2006.01) |

(52) U.S. Cl.

CPC .......... *F27D 19/00* (2013.01); *B22D 11/1206* (2013.01); *B22D 11/124* (2013.01); *B22D 11/142* (2013.01); *B22D 11/225* (2013.01); *F27D 9/00* (2013.01); *F27D 2009/0013* (2013.01); *F27D 2019/0003* (2013.01); *F27D 2019/0056* (2013.01); *F27D 2019/0087* (2013.01)

(58) Field of Classification Search

CPC ... B22D 11/12; B22D 11/1206; B22D 11/124; B22D 11/142; B22D 11/225
USPC .......................................................... 164/417
See application file for complete search history.

(56) References Cited

FOREIGN PATENT DOCUMENTS

| | | | | |
|---|---|---|---|---|
| CN | 106123617 A | * 11/2016 | | F27D 9/00 |
| CN | 110500890 A | 11/2019 | | |
| JP | 5877760 A | 5/1983 | | |

OTHER PUBLICATIONS

Machine translation of CN 106123617 A (Year: 2016).*
(Continued)

*Primary Examiner* — Kevin P Kerns
(74) *Attorney, Agent, or Firm* — K&L Gates LLP

(57) ABSTRACT

A plant to produce metal products, and a corresponding management method, where the plant includes a production line which includes a plurality of operating units, each provided with respective hydraulic circuits, selected from a melting unit, a casting unit, a rolling unit and a cooling treatment apparatus, and a water supply unit having a tank for the water connected to each of the hydraulic circuits and a plurality of water feed devices configured to feed water from the tank to respective hydraulic circuits.

5 Claims, 2 Drawing Sheets

(56) References Cited

OTHER PUBLICATIONS

International Search Report for corresponding application PCT/IT2021/050094 filed Apr. 7, 2021; Report dated Jun. 11, 2021.

* cited by examiner

PLANT FOR THE PRODUCTION OF METAL PRODUCTS AND METHOD OF MANAGEMENT OF SAID PLANT

FIELD OF THE INVENTION

The present invention concerns a plant to produce metal products, suitable to produce flat metal products, such as strip, or long products such as blooms, bars, slabs or round pieces, starting from molten steel, and a method to manage the plant. In particular, the invention concerns a plant and corresponding management method that allow to greatly reduce energy consumption correlated to the supply of cooling water.

BACKGROUND OF THE INVENTION

Plants to produce metal products are known, comprising a unit for casting slabs and a rolling unit located downstream of the casting line.

The casting unit is fed with molten steel having determinate properties and characteristics, and supplies a slab with predetermined sizes at exit.

The casting unit generally comprises a ladle into which the molten metal is fed, a mold with corresponding crystallizer and possibly a pre-rolling device with rolls to carry out a pre-rolling of the liquid core of the slab, reducing its thickness before feeding it to the rolling line.

The rolling unit is provided with a plurality of rolling stands disposed in sequence one after the other, in which the slab is progressively reduced in thickness to obtain the semi-finished metal products with the desired thickness.

It is also known to subject the semi-finished products, downstream of the rolling unit and before winding them into coils or cutting them to size, to a rapid cooling treatment, also called quenching or hardening treatment in the specific field, which allows to obtain a determinate surface treatment of the product.

As is known, since the slab leaving the casting unit can have temperatures in the order of 1000-1200° C., in order to guarantee the correct functioning of the casting unit and the rolling unit it is necessary to provide a cooling of the various components located in contact with or in proximity to the semi-finished product being worked, so as to prevent malfunctions thereof.

Cooling is normally carried out by feeding water which acts as a heat transfer fluid in heat exchange circuits associated with each of the components. Generally, the production plants for metal products in question are provided with a tank containing water at a temperature substantially equal to the ambient temperature, and with a plurality of feed devices, which take the water from the tank and feed it to the heat exchange circuits, along respective delivery branches. The water that has heated up in contact with the units, or components, or directly with the metal product, is then made to flow back into the tank through respective return branches.

For cooling or quenching treatments, it is necessary to provide large water flow rates.

It is known, however, that at least the casting and rolling units and the cooling devices downstream of them are subjected to a discontinuous functioning since, depending on the type of metal product being worked or the type of process applied, operating intervals, in which there is a slab or a semi-finished product to be processed in them, alternate with non-operating intervals in which no slab or semi-finished product is present in them.

While in the case of "endless" processes the alternation of operating intervals and non-operating intervals is less evident, in "semi-endless" or "coil-to-coil" processes the alternation of intervals is more significant.

Furthermore, the water flow rates required can be very variable, depending on the sizes and chemical properties of the semi-finished product to be treated; for example, in the case of the cooling or quenching unit, they can vary between 0 and 15000 $m^3$/h.

In order to be able to guarantee at all times the water flow rate necessary for cooling, normally, in plants to produce metal products of a known type, the feed devices are switched on when the plant is started, and are kept active during the entire production process, providing diversion means to divert the water directly to the tank during non-operating intervals.

The high demand for water for cooling purposes therefore entails both a high consumption of water, which, however, is at least partly recovered by means of the tank, and also high energy consumption to keep the feed devices switched on and provide large water flow rates even when in fact it would not be necessary.

Document CN106123617A describes a rolling plant and a regulation system which allows to obtain an optimized rolling method from the energy point of view. CN106123617A, while providing to be able to regulate the flow rate of the pumps along a cooling circuit of the operating units, does not allow to immediately supply the cooling water with the required operating parameters of flow rate and pressure.

Document CN110500890 concerns a system to control the water supplied to a forging machine, which comprises devices to measure the parameters of the water supply circuit, which are recorded by means of a PLC controller, and provides to periodically perform a control of the circuit pressure to assess whether it is in line with the requirements of the process or has to be adjusted.

Document JPS5877760A concerns a secondary cooling circuit of a slab in a continuous casting machine, which provides to adjust the water supply pump to obtain the desired water flow rate.

There is therefore a need to perfect a method and an apparatus to manage the cooling water of a plant to produce metal products that can overcome at least one of the disadvantages of the state of the art.

Another purpose of the present invention is to obtain a method and an apparatus to manage the cooling water that allow to considerably reduce energy consumption, at the same time guaranteeing the water flow rates required by the various operating units or apparatuses.

Another purpose of the present invention is to obtain a method and a plant to manage the cooling water that are able to adapt the water supply according to the different work processes implemented and the types of products worked.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, some embodiments described here concern a plant to produce metal products comprising a plurality of operating units or apparatuses.

In particular, the plant comprises one or more of:

a continuous casting unit, configured to cast a slab with predefined sizes;

a rolling unit, disposed downstream of the casting unit, and configured to reduce the thickness of the slab until a metal product with a determinate final thickness is obtained; and a cooling apparatus, disposed downstream of the rolling unit, and configured to carry out a rapid cooling treatment, also known as quenching treatment, on the metal product in transit.

The casting unit comprises an ingot mold, with corresponding crystallizer, and a pre-rolling device with rolls, wherein the crystallizer and pre-rolling device are provided with respective primary and secondary cooling circuits.

The rolling unit can comprise, disposed in sequence with respect to each other:

a roughing unit, comprising one or more rolling stands, configured to obtain a roughened slab with a first reduction in thickness;

an induction heating furnace configured to heat the roughened slab to a temperature suitable to allow it to be worked;

a finishing unit, also comprising one or more rolling stands, configured to reduce the thickness of the roughened slab and obtain a metal product having a determinate final thickness.

The plant can also comprise a melting unit configured to obtain a bath of molten metal having determinate chemical characteristics starting from scrap and/or direct reduced iron (DRI), or combinations thereof.

Each of the operating units, that is, casting unit, rolling unit, cooling apparatus and melting unit, is provided with respective hydraulic circuits in which there generally flows water as a heat transfer fluid. The hydraulic circuits, in the case of the casting unit and the rolling unit, can be connected to respective heat exchange circuits suitable to cool one or more of the components of the unit, such as crystallizer, mold, rolls of the rolling stands, or possibly the metal product itself, and in the case of the cooling unit, they can be connected to delivery devices to deliver water directly onto the metal product being worked.

According to some embodiments, the plant comprises a water supply unit comprising a tank suitable to contain water and maintain it at a temperature substantially equal to ambient temperature, and connected by means of respective delivery and return conduits to the different hydraulic circuits.

The plant also comprises a plurality of water feed devices, such as pumps or solenoid valves, which can be selectively activated to draw water from the tank and feed it into the delivery circuits.

The plant also comprises a control unit configured to receive information about the characteristics of the metal products to be produced and the speed of advance of the metal products in the individual operating units, that is, casting unit, rolling unit, and cooling apparatus, and command the water feed devices to selectively supply water to the respective circuits based on each of their requirements.

According to some embodiments, the control unit is configured to activate the water feed devices at a determinate advance interval with respect to the start of the respective operating interval of the component or operating unit associated with the respective hydraulic circuit, so as to fill and pressurize the respective delivery circuit with water before it is necessary to deliver it, so as to always guarantee the delivery of water with the required quantity, flow rate and pressure. In this way, at the starting instant of each operating interval, that is, as soon as the delivery of the cooling water is required, the water is immediately available with the quantity and flow rate required on each occasion, without any delay or waiting time caused by the time required to fill the delivery conduits.

In particular, the control unit can receive, from a management unit of the plant, information regarding a “recipe” for a determinate metal product, comprising the duration of the operating and non-operating intervals for each unit or component, in the event of respective “coil-to-coil”, “semi-endless” or “endless” processes, and command each of the feed devices as a function of the type of product being worked and the operating and non-operating intervals.

According to some embodiments, the “recipes” comprise one or more pieces of information/parameters selected from physical properties and composition of the metal, size of the slab and of the final product, number of stands and/or rolling passes necessary to obtain a determinate thickness, temperature of the metal product, and/or temperature and/or flow rate of the cooling water required for the metal product in transit and/or for the components located in contact with it, or in its proximity.

According to some embodiments, the determinate advance interval can be estimated and/or calculated by the control unit based on the information/parameters defined by the recipe, or by parameters correlated thereto, possibly also detected during the functioning of the plant, such as speed of advance of the metal product, quantity/flow rate of water required on each occasion, and based on the length and section sizes of the respective delivery circuits, which can be provided by the plant designer.

According to some embodiments, the feed devices are pumps with adjustable flow rate, and each of them is associated with a converter device configured to vary the frequency of the electric power supply current of the associated device, so as to regulate its flow rate.

Some embodiments described here also concern a method to manage a plant to produce metal products comprising one or more operating units selected from a casting unit, a rolling unit, and a cooling apparatus suitable to carry out a quenching treatment of the metal product, each associated with respective hydraulic circuits to feed cooling water into heat exchange circuits and/or onto the metal product in transit.

The method according to the invention provides to:

receive information relating to the characteristics of the products being worked in relation to the sizes, thickness, and chemical composition of the metal products to be obtained;

receive information relating to the respective cooling parameters, including one or more of either water flow rate, pressure, water delivery time, temperature difference between water at entry and water at exit, and relating to the respective operating and non-operating times of one or each operating unit, or apparatus;

command feed devices to feed water toward the respective hydraulic circuits of one or more operating units or cooling apparatuses as a function of the respective operating and non-operating intervals of each operating unit or apparatus.

According to some embodiments, the method provides to feed the water to the respective hydraulic circuits by activating, in an autonomous and independent manner with respect to each other, all and only the pumping devices necessary to deliver on each occasion, in correspondence with each operating interval, the water flow rate required with predefined pressure.

In other words, the necessary water is fed to each operating unit during the operating intervals, so as to suitably cool their components, and/or the product in transit, and water is not fed, or its feed is at least reduced, to the individual units during the respective non-operating intervals.

In this way, it is possible to obtain considerable energy and cost savings, since, in fact, the feed devices, instead of remaining switched on for the entire process, are selectively switched on only when they are needed, and remain switched off when no water is required.

According to other embodiments, the method provides to use converter devices to control the pumping devices, in such a way as to regulate their functioning and power based on the water flow rates and pressures required on each occasion.

According to some advantageous variants of the invention, the method provides to receive information regarding the starting instants of each operating interval of each operating unit, or apparatus, and to command the activation of the converters in advance with respect to the starting instant of each operating interval, so as to start the ramping up of the inverter before the instant in which it is necessary for it to be fully operational. In this way, the delivery of water with suitable flow rate and pressure characteristics is always guaranteed.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
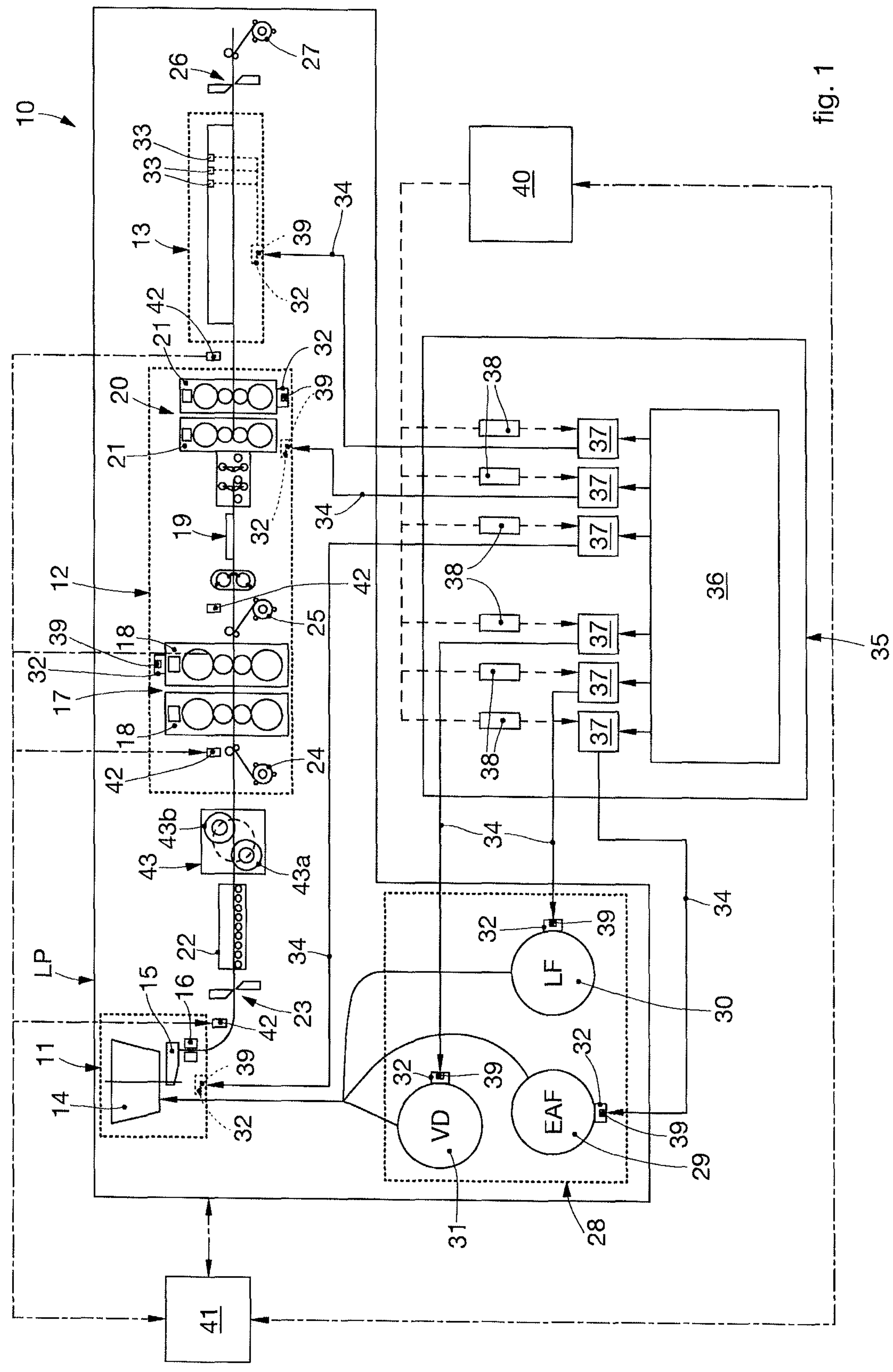
FIG. 1 is a schematic view of a plant to produce metal products according to some embodiments described here.

The embodiments described here with reference to FIG. 1 concern a plant 10 to produce metal products, such as flat products, such as strip or sheets, or long products, such as blooms, slabs, bars, tubes, or round pieces, starting from molten steel.

The plant 10 can comprise a plurality of operating units, including one or more of:

- a continuous casting unit 11, configured to receive molten metal having determinate chemical characteristics and to cast a slab with predefined sizes;
- a rolling unit 12, located downstream of the casting unit 11 and configured to reduce the thickness of the slab until a metal product with a determinate final thickness is obtained;
- a cooling, or quenching, apparatus 13 located downstream of the rolling unit 12 and configured to carry out a rapid cooling or quenching treatment on the metal product.

The casting unit 11 can comprise, in a known manner, a ladle 14, a mold 15 with corresponding crystallizer 16 and possibly a pre-rolling device with rolls, located in succession with respect to each other.

The rolling unit 12 can comprise, disposed in sequence with respect to each other, one or more of:

- a roughing unit 17, comprising one or more rolling stands 18, configured to obtain a roughened slab with a first reduction in thickness;
- an induction heating furnace 19 configured to heat the roughened slab to a temperature suitable to allow it to be worked;
- a finishing unit 20, which also comprises one or more rolling stands 21, configured to reduce the thickness of the roughened slab and obtain a metal product having a determinate final thickness.

The plant 10 can also comprise a heating furnace 22 disposed between the casting unit 11 and the rolling unit 12, configured to heat the cast slab to a determinate rolling temperature, or maintain it at said temperature.

The plant 10 can also comprise one or more of:

- first cutting means 23, configured to cut to size a slab upstream of the rolling unit 12, in the case of a “coil-to-coil” or “semi-endless” type process;
- winding/unwinding devices 24, 25, located upstream and downstream of the roughing unit 17, or of a rolling stand 18, if they are of the reversible type, configured to selectively wind and/or unwind the roughened slab and to maintain it at the rolling temperature;
- second cutting means 26 configured to carry out the head/tail trimming and possible scrapping of the roughened slab in the event of an emergency, or to cut to size the semi-finished metal products at exit from the rolling unit 12 or downstream of the cooling apparatus 13;
- a winding reel 27 configured to wind the metal products obtained, in particular in the case of flat rolled products.

The plant 10 can provide a winding/unwinding device 43 with at least two mandrels **43*a*, 43*b* to carry out a winding/unwinding step following the rapid heating step. In the example case, the two mandrels 43*a*, 43*b* are able to selectively and alternatively carry out the function of winding the metal product heated in the heating furnace 22 and of unwinding it in order to feed it to a subsequent rolling stand 18 of the reversible type of the roughing unit 17**.

The plant 10 can also be provided with a melting unit 28, configured to obtain a bath of molten metal with determinate chemical characteristics, comprising one or more of either an electric arc furnace (EAF) 29, a ladle furnace (LF) 30, or a vacuum degassing (VD) treatment apparatus 31.

The melting 28, casting 11, and rolling 12 units and the treatment apparatus 31 form a production line LP.

According to one aspect of the present invention, each operating unit 11, 12, 28, or each apparatus 13, 14, 15, 16, 17, 20, 29, 30, 31, or each component 18, 21, is provided with respective hydraulic circuits 32 for the flow of a water flow suitable to cool the components located in contact with or in the proximity of the metal product being worked, or to cool/treat the metal product itself.

According to possible embodiments, in the case of the casting 11, rolling 12 and melting unit 28, the respective hydraulic circuits 32 can be connected to respective heat exchange circuits, not shown, associated with one or more components or apparatuses 14, 15, 16, 17, 18, 20, 21, 29, 30, 31 so as to cool them in a suitable manner.

According to possible embodiments, at least in the case of the cooling apparatus 13 the, or the respective, hydraulic circuits 32 can be connected to delivery nozzles 33 suitable to deliver water with the required pressure and flow rate onto the metal product.

According to some embodiments, the plant 10 comprises a water supply unit 35 comprising a tank 36, suitable to contain water maintaining it at a temperature substantially equal to ambient temperature, connected to the different hydraulic circuits 32 by means of respective delivery 34 and return (not shown) conduits.

According to some embodiments, the hydraulic circuits 32 can comprise valves or other interception devices 39 which can be selectively activated to allow the water present in the delivery conduits 34 to flow toward the respective hydraulic circuit 32, or divert it, when it is not required, into the return conduit toward the tank 36.

The water supply unit 35 also comprises a plurality of water feed devices 37, which can be selectively activated to allow the circulation of the water from the tank 36 toward the respective delivery conduits 34.

According to some embodiments, the water feed devices 37 can comprise one or more of either solenoid valves, pumping devices, or a combination thereof.

According to some embodiments, each water feed device 37 comprises a plurality of pumping devices, the number of which can vary as a function of the water flow rate and pressure required by the respective hydraulic circuit 32 and by the operating unit 11, 12, 13, 28, or apparatus/component with which it is associated, and the working power of the single pumping device.

According to some embodiments, the plant also comprises a plurality of converter devices 38, or inverters, each associated with one or more pumping devices, which can be selectively driven to activate/deactivate the respective pumping devices with which they are associated, or to regulate their functioning, and in particular to vary their flow rate as a function of requirements.

According to some embodiments, the electric current fed to the frequency devices can be varied by means of the converters 38, for example changing its intensity or frequency, consequently adjusting the flow rate of the water fed by the latter.

According to one aspect of the present invention, the plant 10 comprises a control unit 40 configured to command the functioning of the water supply unit 35, and in particular of the water feed devices 37, to selectively supply water to the respective circuits 32 based on the requirements of each of the operating units 11, 12, 13, 28, or apparatuses, with which they are associated.

According to some embodiments, the plant 10 comprises a single control unit 40 configured to manage the functioning of the water supply unit 35 for all operating units 11, 12, 13, 28.

According to possible alternative solutions, a plurality of control units 40 can be provided, each associated with a single operating unit 11, 12, 13, 28 or with a subset thereof, and configured to manage the functioning of the water supply unit 35 for the respective individual unit or subset.

According to some embodiments, the control unit 40 is configured to receive information regarding the characteristics of the metal products to be produced and the speed of advance of the metal products in the individual operating units 11, 12, 13 or 28, or in the respective apparatuses of each of such operating units, and to command the water supply unit 35 accordingly.

Figure 2:
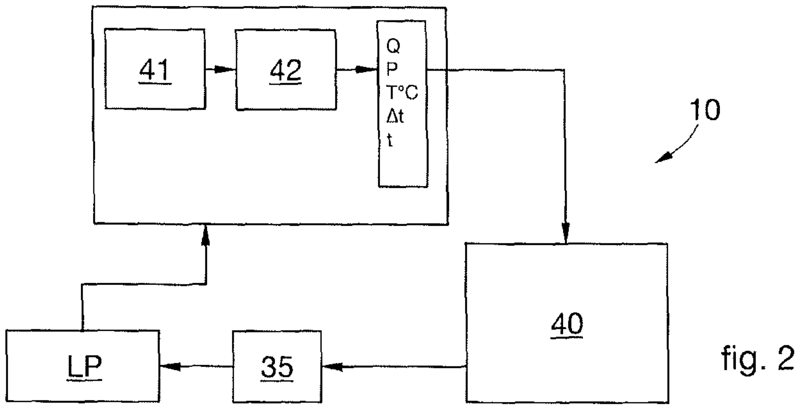
FIG. 2 shows a block diagram of a control apparatus of the plant of FIG. 1.

In particular, the control unit 40 can receive, from a management unit 41 of the plant, information regarding a "recipe" for a determinate metal product, comprising respective durations of operating and non-operating intervals for each operating unit 11, 12, 13, or apparatus, and can command each of the water feed devices 37 to activate them in correspondence with their respective operating intervals and deactivate them in correspondence with the non-operating intervals (FIG. 2).

According to some embodiments, the "recipes" supplied to the control unit 40 can comprise one or more pieces of information/parameters selected from physical properties and composition of the metal, size of the slab and of the final product, number of stands and/or rolling passes necessary to obtain a determinate thickness.

Based on these parameters, and possibly also based on the speed of advance of the semi-finished product or of the metal product along the production line LP, it is possible to determine and/or estimate the temperature of the metal product, and/or the temperature T° C. and/or flow rate Q of the cooling water required for the metal product in transit and/or for the components in contact with it, and the required delivery time t (FIG. 2).

As a function of this information, the control unit 40 can consequently activate all and only the pumping devices necessary to supply the required water flow rate/pressure substantially only for a time correlated to the operating intervals.

By "operating interval" we mean a time interval during which a metal product is subjected to working, and therefore a supply is required of cooling water with the appropriate flow rate and pressure, while by "non-operating interval" we mean a time interval during which there is no metal product being worked and the respective operating unit, or apparatus, is in a suspended or stand-by step.

The non-operating intervals can be of different types or durations, as a function of the respective operating unit or apparatus 11, 12, 13, 28, or the type of process in progress.

Figure 3:
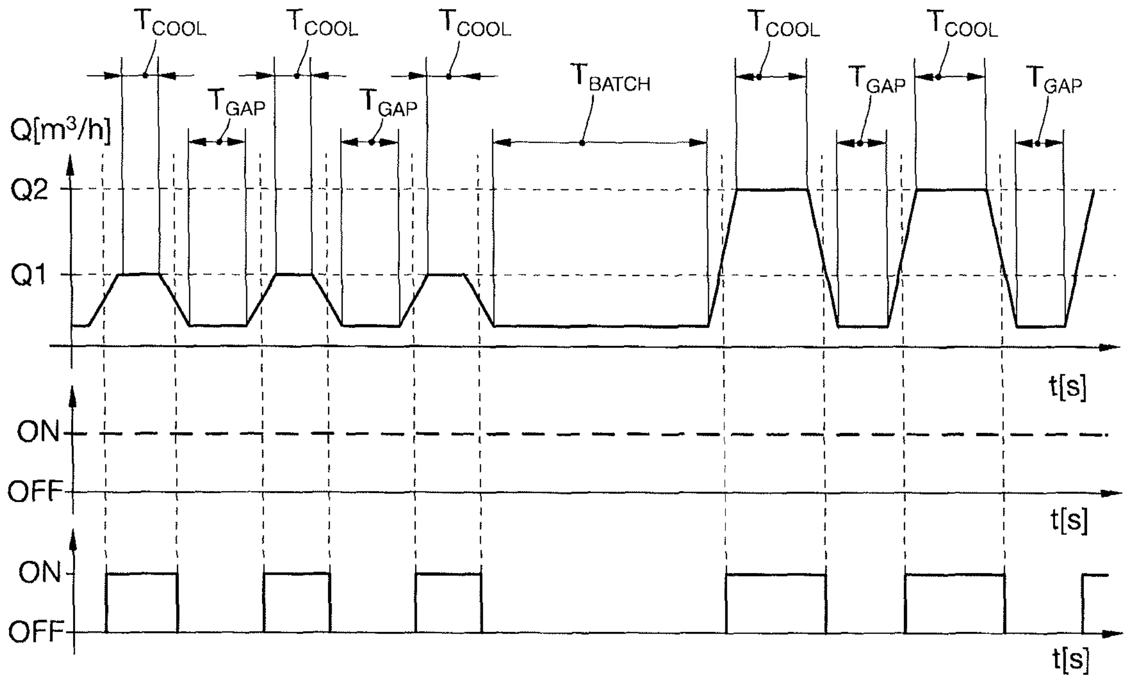
FIG. 3 shows a graph that shows the water flow rate required over time for different types of product and the consequent activation of the pumping devices according to the state of the art and according to the invention.

By way of example, in the case of a "coil-to-coil" process, "gap time" intervals $T_{GAP}$ can occur in the cooling apparatus 13, for example between the arrival of one product to be worked and the next one, and "batch time" intervals $T_{BATCH}$ can occur when it is necessary to change the type of products being worked, which alternate with the operating or cooling intervals $T_{COOL}$ (FIG. 3).

In the case of an "endless" type process, only the "batch time" intervals occur, since the process is substantially continuous between the casting unit 11 and the cooling apparatus 13.

In the case of the rolling unit 12, the operating interval $T_{COOL}$ substantially corresponds to the time for rolling the slab, while the non-operating intervals can comprise both the interval between the working of one slab and the next, and also the waiting time for the adjustment of the rolls in the case of a rolling stand of the reversible type, and also the time for changing the type of products.

The durations of the operating and non-operating intervals can be highly variable. By way of example, for a cooling or quenching apparatus 13, they can have the following durations:

operating interval $T_{COOL}$: between 15 and 40 sec;

gap time $T_{GAP}$: from 80 to 180 sec;

batch time $T_{BATCH}$: from 220 to 550 sec.

In the case of the plate mill PM of a rolling unit 12, the operating interval can have a duration comprised between 140 and 180 sec and the non-operating interval can have a duration comprised between 240 and 280 sec.

From the above examples, it is clear that if the pumping devices of the water feed devices 37 are switched on in correspondence with the operating intervals and switched off in correspondence with the non-operating ones, there is a considerable saving in energy consumption, since for most of the time they can be kept inactive, or active at minimum.

By "active at minimum" we mean that the pumping devices can be kept switched on and functioning at the minimum power provided for each of them, for example comprised between 10% and 40% of the rated power.

By way of example, in the case of the cooling apparatus 13 there can be provided between 4 and 10 pumping devices, each suitable to supply water with a determinate flow rate, for example comprised between 1000 and 1500 $m^3/h$, a determinate pressure, for example between 4 and 8 bar ($4\text{-}8\times10^5$ Pascal) and a determinate power, for example comprised between 300 and 500 kW.

FIG. 3 shows, by way of example, the trend of the water flow rate required in the case of a cooling apparatus 13 which operates in a "coil-to-coil" process for a first and a second type of product, which require a first flow rate Q1 and a second flow rate Q2.

As can be seen in FIG. 3, in the plants according to the state of the art, the pumping devices are always switched on and at maximum power (dotted line), and they send water continuously to the respective hydraulic circuits 32, regardless of actual requirements. According to the invention (solid line), on the contrary, the pumping devices are alternately switched on and off, or possibly kept at minimum power functioning regime, in order to deliver water only when it is actually required.

Since, as a function of the type of metal product being worked, the water flow rate required can vary between 0 and 15000 $m^3/h$, the number of pumping devices active on each occasion can vary as a function of requirements.

For example, the control unit 40 can determine, based on the "recipe" and/or the information received from the management unit 41, how many pumping devices are required for each combination of water flow rate and pressure required, and command the activation of all and only the pumping devices required.

Referring to the example of the cooling apparatus 13 described above, the control and command unit 40 can activate:

- no pumping device if the flow rate required is 0 $m^3/h$;
- a single pumping device if the flow rate required is less than 1000 $m^3/h$;
- four pumping devices if the flow rate required is less than 4,000 $m^3/h$;
- all pumping devices if the flow rate required is 8000 $m^3/h$.

Preferably, each pumping device can be commanded autonomously and independently with respect to the others.

According to some embodiments, the control unit 40 can command the pumping devices by acting on the respective converter devices 38 associated therewith, so as to guarantee that during the operating intervals $T_{COOL}$ the water is delivered at the required pressure.

In the case of a roughing unit 17, in particular for a Plate Mill (PM), there can be provided four pumping devices for the low-pressure PM, with a flow rate comprised between 1300 and 1400 $m^3/h$, pressure comprised between 5-6 bar and power comprised between 380-450 kW, while for the high-pressure PM there can be provided four pumping devices having flow rate comprised between 800 and 850 $m^3/h$, pressure comprised between 14-15 bar and power comprised between 500-600 kW.

Also in this case, the control unit 40 can command the activation of only the pumping devices required to guarantee the correct supply of water to the respective hydraulic circuit 32.

For example, two pumping devices can be activated for low-pressure PM and two for the high-pressure PM, when the PM requires about 3200 $m^3/h$, while three pumping devices can be activated for the low-pressure PM and three for the high-pressure PM when the flow rate required is around 6400 $m^3/h$.

In the case of the melting unit 28 and of the casting unit 11, verifying and determining the number of pumping devices required on each occasion can be carried out in a similar manner.

According to some embodiments, the activation/deactivation of the individual pumping devices can also be performed based on the difference in temperature of the water between the entry and exit of the respective heat exchange circuits, or the temperature of the water at exit, detected with special sensors.

For example, if the temperature difference is smaller than a determinate threshold value, or the temperature at exit is greater than a maximum value, it can be provided to increase the number, or speed, of the respective pumping devices, while in the event the temperature difference is greater than a second threshold value, or the temperature at exit is lower than a limit value, it can be provided to reduce the number, or speed, of the pumping devices, preferably acting by means of the converters 38.

According to some embodiments, in order to guarantee that when it is necessary to deliver the water in the circuit, it has the flow rate and pressure required, the control unit 40 can be configured to activate the pumping devices at a determinate advance time $\Delta t$ with respect to the starting instant of each operating interval $T_{COOL}$.

The entity of the operating interval $\Delta t$ can be determined in the design phase of the water supply unit 35, or be derived and calculated on the basis thereof, since it is correlated and dependent on the length and section of the delivery conduits 34.

The $\Delta t$ can be calculated as the time required to pressurize the delivery conduits 34 so that, at the starting instant to of the operating interval $T_{COOL}$, in correspondence with the respective hydraulic circuit 32, there is water with the required pressure.

Figure 4:
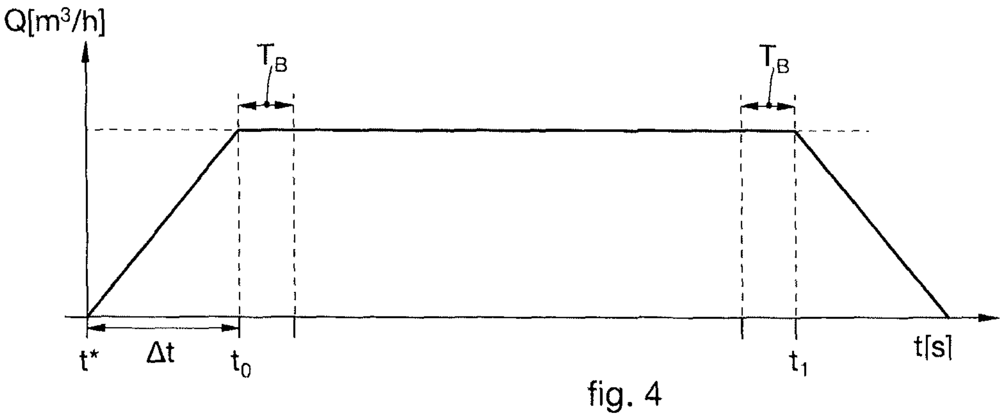
FIG. 4 is a graph showing the trend of the flow rate of the water fed in correspondence with an operating interval according to some embodiments described here.

According to some embodiments, the control unit 40 provides to activate, at the instant $t^*=t_0-\Delta t$, the converter devices 38 associated with the pumping device(s) required, in order to start their ramping up and prevent the water from being delivered late, or with unsuitable pressure (FIG. 4).

According to some embodiments, the starting instant $t_0$ of each operating interval can be determined based on the "recipe" associated with the type of metal product to be produced and the expected speed of advance of the semi-finished product or product along the production line LP.

According to some variants, the starting instant $t_0$ of one or more operating intervals can be also determined, or calculated, or estimated, based on one or more parameters detected and monitored in real time during the process. By way of example, one or more detection devices 42 can be provided along the production line LP, configured to measure the actual speed of advance of the product in the production line LP.

There can also be provided devices to monitor the functioning status of one or more operating units 28, 11, 12 or of one or more of the respective apparatuses disposed downstream, which can be connected to and communicate with the management unit 41.

For example, in the event a malfunction occurs, such as a jam or a break in the roughing unit 17, it can be provided to keep the water feed devices 37 of the apparatuses disposed downstream of the roughing unit 17 at minimum, until normal functioning conditions have been restored and, once the process has been restarted, consequently calculate the starting instants $t_0$ of the corresponding operating intervals for each operating unit and apparatus of the production line LP.

According to other embodiments, the control unit 40, at the end of the operating interval $T_{COOL}$, that is, at the instant $t_1$, will provide to deactivate the previously activated converter devices 38, in such a way as to switch off the pumping devices, or keep them switched on at minimum.

According to some embodiments, the starting instant $t_0$ and the ending instant $t_1$ considered can coincide with the real starting and ending instants, or they can be different, providing precautionary intervals, or buffer time $T_B$ respectively before and after the real starting and ending instants so as to compensate for any small deviations from them.

The interaction between the management unit 41 of the production line LP, the water supply unit 35 and the control unit 40 which communicates with both and consequently regulates the water supply according to real requirements, allows high versatility and adaptability of the plant 10 for any type of metal product whatsoever, and at the same time allows to optimize energy consumption.

Some embodiments described here also concern a method to manage a plant 10 to produce metal products as described above. The method provides to receive information relating to the characteristics of the products being worked in relation to the sizes, thickness, and chemical composition of the metal products to be obtained;

receive information relating to the respective cooling parameters, comprising one or more of water flow rate, pressure, water delivery time, temperature difference between water at entry and water at exit, and the respective operating and non-operating times of one or more operating units 11, 12, 28 or cooling apparatuses 13;

command the feed devices 34 to feed water toward respective delivery conduits 34 associated with each of the hydraulic circuits 32 as a function of the respective operating and non-operating intervals of each operating unit 11, 12, 28 or cooling apparatus 13.

According to some embodiments, the management method provides to feed the water to the respective hydraulic circuits 32 by activating, in an autonomous and independent manner with respect to each other, all and only the pumping devices required to deliver on each occasion, in correspondence with each operating interval, the required water flow rate with predefined pressure, and provides to deactivate the pumping devices, or keep them switched on at minimum, in correspondence with the non-operating intervals.

According to other embodiments, the method provides to regulate the functioning and power of the pumping devices by means of converter devices 38, based on the water flow rates and pressures required on each occasion.

According to some embodiments, the method provides to command the activation of the converter devices 38 in advance with respect to the starting instant of each operating interval, so as to start the ramping up of each converter device 38 before the instant in which it is necessary for it to be fully operational.

It is clear that modifications and/or additions of parts or steps may be made to the plant 10 to produce metal products, and to the management method as described heretofore, without departing from the field and scope of the present invention as defined by the claims.

It is also clear that, although the present invention has been described with reference to some specific examples, a person of skill in the art shall certainly be able to achieve many other equivalent forms of plant 10 to produce metal products, and management method, having the characteristics as set forth in the claims and hence all coming within the field of protection defined thereby.

The invention claimed is:

1. A plant to produce metal products, said plant comprising:

a production line which includes a plurality of operating units, each provided with hydraulic circuits, selected from a melting unit, a casting unit, a rolling unit and a cooling apparatus, a water supply unit equipped with a tank connected, by means of respective delivery circuits, to each of said hydraulic circuits, and a plurality of water feed devices, associated with said delivery circuits and configured to feed water from said tank to each of said hydraulic circuits, and a control unit configured to receive information at least on characteristics of the metal products to be produced, and on a speed of advance of said metal products along said operating units, and information correlated to actual operating intervals of one or more of said operating units to determine for at least one of said operating units, a starting instant of each operating interval and to command said water feed devices to selectively supply water to the respective hydraulic circuit of said at least one operating unit at a determinate advance time with respect to said starting instant based on actual functioning operating modes of said at least one operating unit.

2. The plant of claim 1, further comprising a plant management unit configured to supply, for each type of metal product to be produced, a specific "recipe" comprising one or more pieces of information/parameters selected from physical properties and composition of a metal, the size of a slab and of a final product, the number of stands and/or rolling passes necessary to obtain a determinate thickness, and respective durations of operating and non-operating intervals for each operating unit, and said control unit is configured to receive the information/parameters from said plant management unit and command each of said water feed devices to activate them only in correspondence with the respective operating intervals.

3. The plant of claim 1, wherein each water feed device associated with a respective hydraulic circuit of said operating units comprises a plurality of pumping devices with adjustable flow rate which are selectively commanded by the control unit independently with respect to each other, or in groups, or all together to supply water on each occasion with a required pressure and flow rate.

4. The plant of claim 3, further comprising a plurality of converter devices, or inverters, each associated with one or more pumping devices, which are selectively commanded to activate/deactivate respective pumping devices with which they are associated to vary a flow rate of the respective pumping devices.

5. The plant of claim 1, further comprising one or more detection devices configured to measure an actual speed of advance of the product along said production line and said control unit is configured to calculate the starting instant of the operating interval of a specific operating unit based on data detected by the respective detection devices.

* * * * *